US011725360B2

(12) United States Patent
Sheedy et al.

(10) Patent No.: US 11,725,360 B2
(45) Date of Patent: *Aug. 15, 2023

(54) SPREADER FOR SEDIMENT CAPPING SYSTEM AND METHOD

(71) Applicant: CASHMAN DREDGING AND MARINE CONTRACTING, CO., LLC, Quincy, MA (US)

(72) Inventors: Chris Sheedy, West Bridgewater, MA (US); Tim Mannering, Marshfield, MA (US)

(73) Assignee: CASHMAN DREDGING AND MARINE CONTRACTING, CO., LLC, Quincy, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/543,892

(22) Filed: Dec. 7, 2021

(65) Prior Publication Data

US 2022/0090341 A1   Mar. 24, 2022

Related U.S. Application Data

(63) Continuation of application No. 17/087,857, filed on Nov. 3, 2020, now Pat. No. 11,332,907, which is a
(Continued)

(51) Int. Cl.
*E02D 3/10* (2006.01)
*E02B 3/12* (2006.01)
(Continued)

(52) U.S. Cl.
CPC ............. *E02D 15/10* (2013.01); *B65G 65/44* (2013.01); *B65G 69/0425* (2013.01);
(Continued)

(58) Field of Classification Search
CPC . E02B 3/08; E02B 3/121; E02B 3/123; B65G 69/0425; B65G 69/0458; B65G 69/0441; B65G 65/44
(Continued)

(56) References Cited

U.S. PATENT DOCUMENTS 3,490,618 A  1/1970 Buschbom
3,603,001 A  9/1971 Arnold
(Continued)

FOREIGN PATENT DOCUMENTS

AT        403519 B     3/1998
CN     110125003 A  *  8/2019
(Continued)

*Primary Examiner* — Frederick L Lagman
(74) *Attorney, Agent, or Firm* — Ward Law Office LLC; Jacob M. Ward

(57) ABSTRACT

A sediment capping system is adapted to create, and distribute, a homogenized mixture of capping material. Where distributing the capping material, the system is configured to militate against the capping material forming clumps of a size and weight that would disturb the sediment on a bottom of a body of water. This in turn militates against the sediment being disturbed, and a disturbing of pollutants and toxins into the water surrounding the sediment. The sediment capping system militates against the clumping of capping material through a vibrating spreader and baffle system, producing a sediment cap with a more consistent depth that will minimally disturb the sediment on the floor of the body of water where the sediment cap is being deposited.

19 Claims, 4 Drawing Sheets

Related U.S. Application Data continuation of application No. 16/825,177, filed on Mar. 20, 2020, now Pat. No. 10,900,192.

(60) Provisional application No. 62/821,619, filed on Mar. 21, 2019.

(51) Int. Cl.
  *E02D 15/10* (2006.01)
  *B65G 69/04* (2006.01)
  *B65G 65/44* (2006.01)

(52) U.S. Cl.
  CPC ..... *B65G 69/0441* (2013.01); *B65G 69/0458* (2013.01); *E02B 3/121* (2013.01); *E02B 3/123* (2013.01)

(58) Field of Classification Search
  USPC ................................................. 405/17, 21
  See application file for complete search history.

(56) References Cited

U.S. PATENT DOCUMENTS

| | | |
|---|---|---|
| 3,799,405 A | 3/1974 | Wallace |
| 3,970,123 A | 7/1976 | Poulton et al. |
| 4,407,606 A | 10/1983 | Larsen |
| 4,564,314 A | 1/1986 | Gallagher |
| 4,669,638 A | 6/1987 | Peleus |
| 4,960,229 A | 10/1990 | Dumbaugh |
| 5,222,839 A | 6/1993 | Ishida et al. |
| 5,413,254 A | 5/1995 | Decker et al. |
| 5,641,249 A | 6/1997 | McClelland |
| 5,775,836 A | 7/1998 | Dean, Jr. |
| 7,695,215 B2 | 4/2010 | Buhr et al. |
| 9,162,263 B2 | 10/2015 | Elia et al. |
| 10,900,192 B2 * | 1/2021 | Sheedy .............. B65G 69/0425 |
| 11,332,907 B2 * | 5/2022 | Sheedy .............. B65G 69/0441 |
| 2003/0230009 A1 | 12/2003 | Chesner et al. |
| 2008/0023504 A1 | 1/2008 | Gaughan et al. |
| 2009/0304447 A1 | 12/2009 | Buhr et al. |
| 2015/0117954 A1 | 4/2015 | Hwang |
| 2016/0017551 A1 | 1/2016 | Wendorff et al. |

FOREIGN PATENT DOCUMENTS

| | | |
|---|---|---|
| FR | 2421125 A1 | 10/1979 |
| FR | 2583377 A1 | 12/1986 |
| JP | S4893564 U | 11/1973 |
| JP | S528871 U | 1/1977 |
| JP | 2764323 B2 | 6/1998 |
| JP | 2002177865 A | 6/2002 |
| JP | 4021039 B2 | 12/2007 |

* cited by examiner

SPREADER FOR SEDIMENT CAPPING SYSTEM AND METHOD

CROSS-REFERENCE TO RELATED APPLICATIONS

This application is a continuation of U.S. patent application Ser. No. 17/087,857, filed on Nov. 3, 2020, now U.S. Pat. No. 11,332,907, issued on May 17, 2022, which is a continuation of U.S. patent application Ser. No. 16/825,177, filed on Mar. 20, 2020, now U.S. Pat. No. 10,900,192, issued on Jan. 26, 2021, which in turn claims the benefit of U.S. Provisional Application No. 62/821,619, filed on Mar. 21, 2019. The entire disclosures of the above applications are incorporated by reference.

FIELD

The present disclosure relates generally to a spreader and, more particularly, to a spreader system and method for creating a sediment cap.

BACKGROUND

Subaquatic contaminated sediments often represent a source of harmful and long-term of pollutants in the environment. A variety of approaches such as dredging have been used for treatment of contaminated sediments. However, these known approaches can be expensive or may have limited effectiveness in remediation.

Due to an increased volume of contaminated sediment cleanup projects, both in the United States and abroad, sediment capping has become a convenient strategy for remediation. Sediment capping serves to isolate otherwise contaminated sediment from organisms in the aquatic environment. Thus, capping of contaminated sediment is an efficient alternative that can be used alone or together with dredging operations to provide an immediate beneficial impact on the environment.

Furthermore, capping contaminated sediments generally creates an anaerobic environment that permits for natural degradation processes. This provides an opportunity for natural destruction and detoxification of harmful contaminants over time. Sediment capping has been used to contain various harmful contaminants, including pesticides, metals, volatile organic compounds (VOCs), semi-volatile organic compounds (SVOCs), and polycyclic aromatic hydrocarbons (PAHs).

The capping of contaminated sediments is further designed to militate against an upward migration of residual contaminants, and to provide a clean subsurface bed of sediment that can be colonized by uncontaminated organisms. Capping alone may be used as a strategy to eliminate the need for dredging or may be used in conjunction with dredging to cover dredged locations with a clean layer of material where target clean-up goals cannot otherwise be achieved.

Known methods of capping contaminated sediments have often involved mechanical equipment using buckets or direct slurry discharge into a water body. The mechanical bucket method typically requires dumping large volumes of capping material into the water using a variety of buckets, including a clamshell bucket or dragline bucket. After releasing a bucket load, the material falls through a water column often as a distinct mass, which usually comes to rest on top of the contaminated material.

However, the mechanical bucket method poses many problems for capping, and especially in relatively shallow water. Where the mechanical bucket method is used to install thin layer caps, especially in shallower water, the results are often undesirable. The capping material travels a relatively short distance through the water, thus causing its weight and velocity to displace the soft contaminated sediments. Displacement of the contaminated sediment is adverse to the purpose and goals of sediment capping. Furthermore, bucket placement of capping material leaves uneven mounds, which must then be raked in order to produce the proper thickness. This raking action often disturbs the underlying sediments, thereby causing sediment mixing and re-suspension of both the capping material and the contaminated sediments. In addition, bucket placement requires deep vessel draft requirements and cannot be employed in relatively shallow operations.

An alternative known capping method involves an open water slurry discharge. Due to the large volume of water needed to transport the sand or gravel material, this method also tends to displace the soft underlying material needing to be capped. Even with the open water slurry discharge method, there are concerns about unevenness of the resulting cap deposits that may require further action to provide the sediment cap with an appropriate even thickness.

There is a continuing need for a sediment capping system and method with a spreader that delivers capping material at relatively high rates of production, and with minimal disturbance of the subaquatic sediment. Desirably, the capping system and method also minimizes the need for further processes to rake or level the resulting cap after it has been deposited.

SUMMARY

In concordance with the instant disclosure, a sediment capping system and method with a spreader that delivers capping material at relatively high rates of production, with minimal disturbance of the subaquatic sediment, and which also minimizes the need for further processes to rake or level the resulting cap after it has been deposited, has been surprisingly discovered.

In one embodiment, the spreader for sediment capping has a hopper. The hopper has a hollow interior, a first opening, and a second opening. The first opening is configured to receive capping material. A baffle system is disposed either above the hopper, or within the hopper, or both above and within the hopper. The baffle system is configured to separate the capping material into a plurality of capping material streams. A rotatable drum is disposed adjacent the second opening of the hopper. The rotatable drum is adapted to receive the capping material streams and disperse the capping material of the capping material streams into a body of water to form a sediment cap on a subaquatic floor of the body of water.

In another embodiment, a sediment capping system has the spreader. The system also includes a primary container configured to hold the capping material in bulk prior to transport to the spreader. The sediment capping system further has a delivery system adapted to transport the capping material from the primary container to the spreader.

In a further embodiment, a method of forming a sediment cap includes a first step of providing the spreader. Then, the method includes steps of transporting the capping material to the spreader and depositing the capping material through the first opening of the hopper of the spreader to form the capping material streams. Finally, the method includes a step of rotating the rotatable drum of the spreader to distribute and disperse the capping material of the capping material streams into the body of water. The sediment cap is thereby formed on the subaquatic floor of the body of water.

DRAWINGS

The above, as well as other advantages of the present disclosure, will become readily apparent to those skilled in the art from the following detailed description, particularly when considered in the light of the drawings described hereafter.

DETAILED DESCRIPTION

Figure 1:
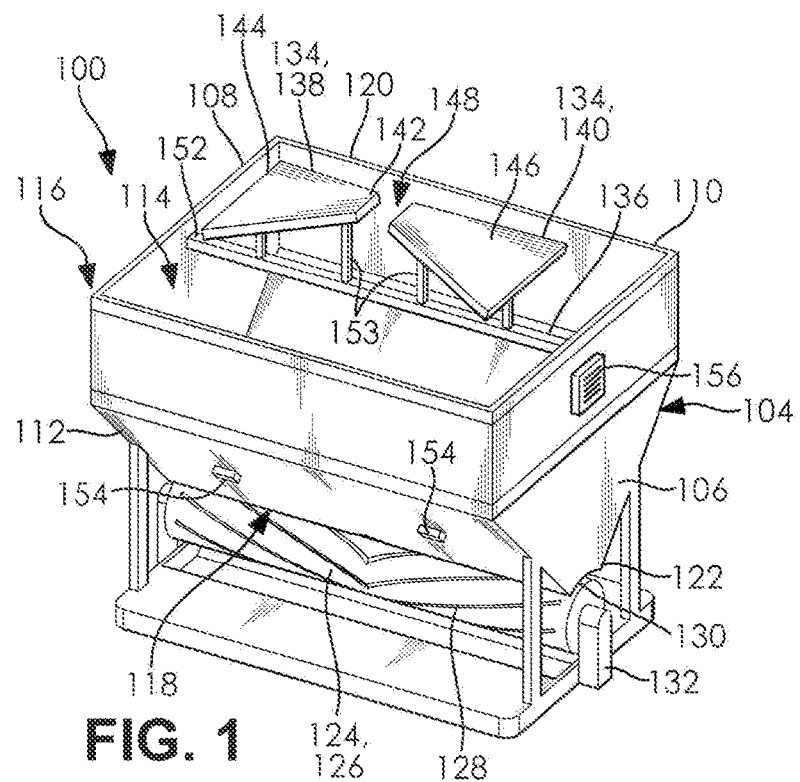
FIG. 1 is a top perspective view of a spreader according to one embodiment of the present disclosure.

The following description is merely exemplary in nature and is not intended to limit the present disclosure, application, or uses. It should be understood that throughout the drawings, corresponding reference numerals indicate like or corresponding parts and features.

Figure 4:
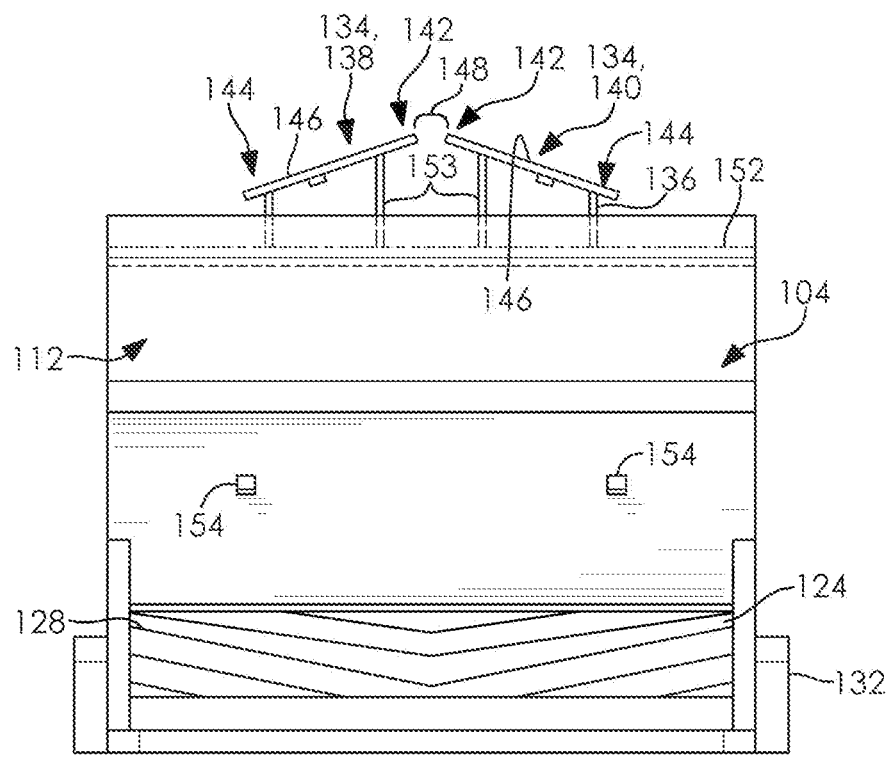
FIG. 4 is a front elevational view of the spreader shown in FIG. 1.
Figure 5:
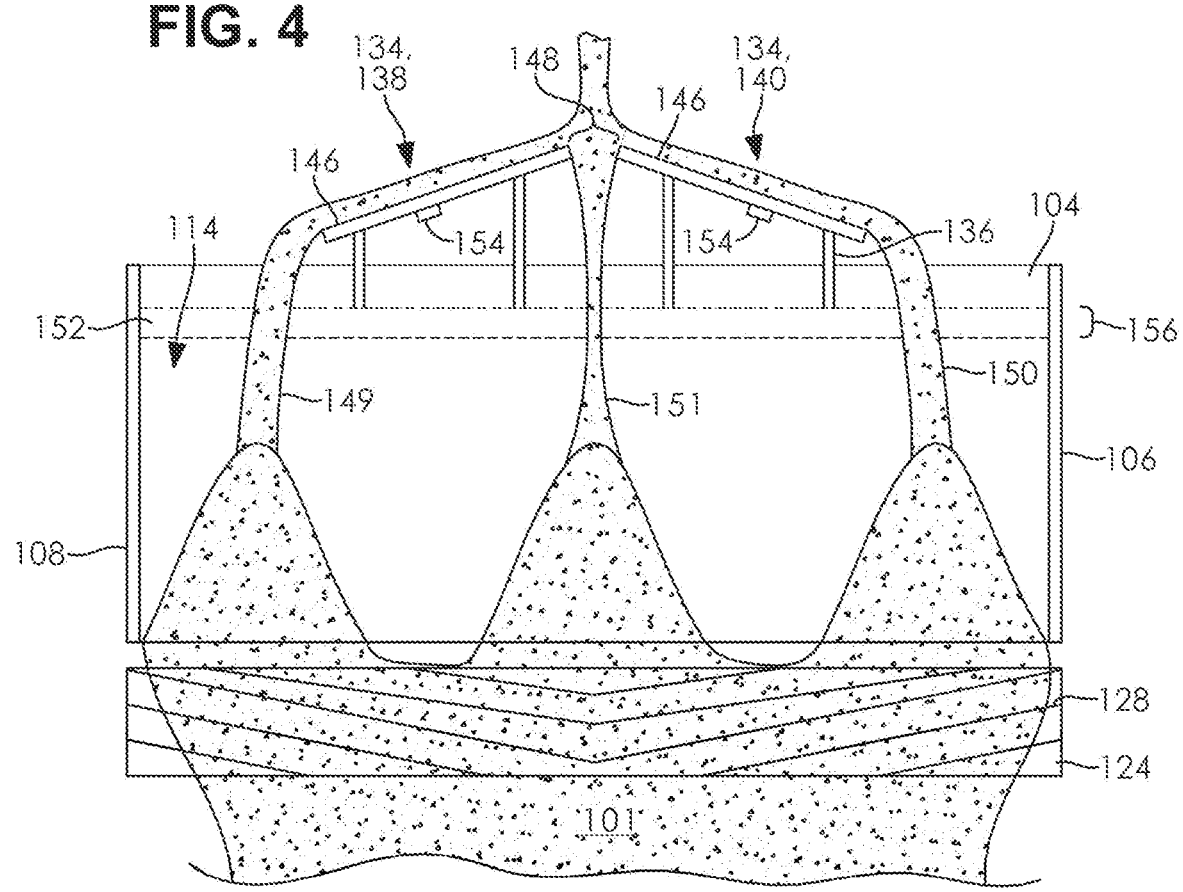
FIG. 5 is a cross sectional, side elevational view taken at section line 5-5 in FIG. 4, and showing the baffle system homogenizing a capping material and disposing the capping material across a rotatable drum.
Figure 6:
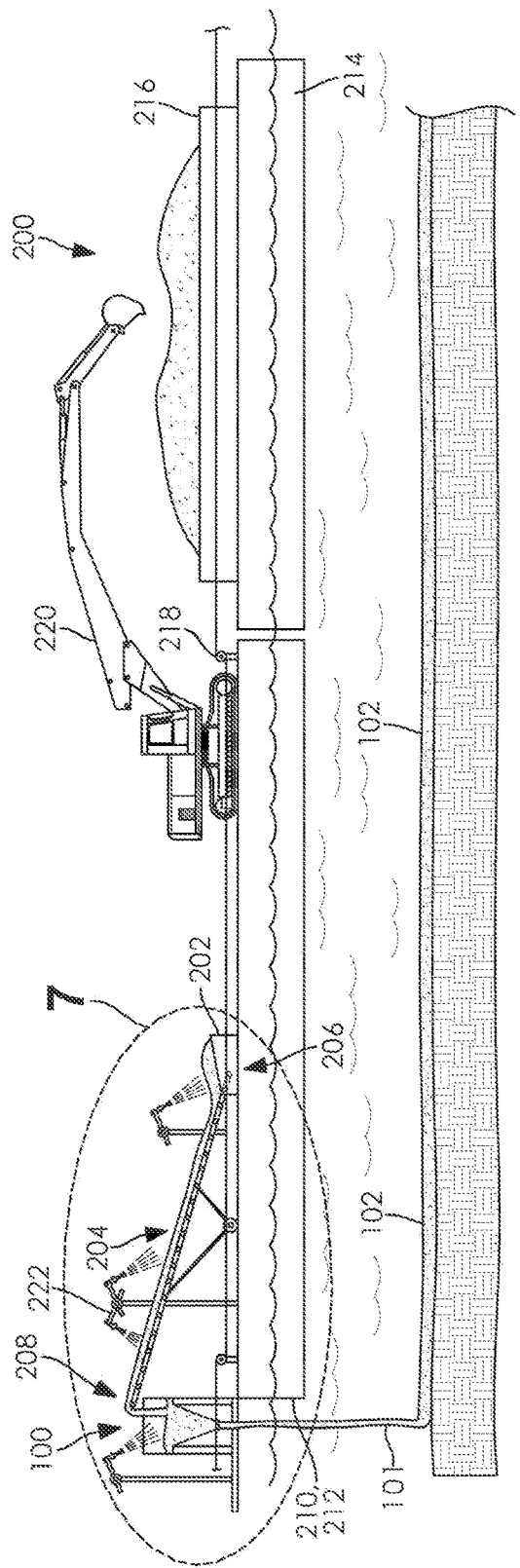
FIG. 6 is a side elevational view of a sediment capping system according to a further embodiment of the present disclosure, showing the sediment capping system with the spreader dispensing the capping material into a body of water.

With reference to FIGS. 1-7, a spreader 100 according to various embodiments of the present disclosure is shown. The spreader 100 may be configured to create and distribute a homogenized mixture of capping material 101 (shown in FIGS. 5-7) at a predetermined location on a floor of a body of water to form a sediment cap 102, for example, as shown in FIG. 6. As non-limiting examples, the body of water may the floor of a lake, a bay, or an ocean.

The spreader 100 is configured to militate against the clumping of the capping material 101, as such clumping may undesirably disturb existing sediment on the floor of the body of water. Advantageously, the spreader 100 may militate against the spread of pollutants and toxins that may be present in the existing sediment beneath the sediment camp 102.

In a non-limiting example, the capping material 101 may be dredged clean sediment, sand or fine gravel, and bio-remediators or chemical agents. In a further example, the capping materials 101 may include AQUABLOCK® composite particle technology, commercially available from AquaBlok, Ltd. in Swanton, Ohio, and which further limits the migration of contaminants into the water surrounding the sediment. One of ordinary skill in the art may also use other suitable types of the capping materials 101 for forming the sediment cap 102, as desired.

As shown in FIG. 1-5, the spreader 100 may have a hopper 104. The hopper 104 may have a front wall 106, a rear wall 108, a first sidewall 110, and a second sidewall 112. The front wall 106, the rear wall 108, the first sidewall 110, and the second sidewall 112 together may define a hollow interior 114 of the hopper 104. The hollow interior 114 may be configured to receive the capping material 101, in operation. Although the front wall 106, the rear wall 108, the first sidewall 110, and the second sidewall 112 are shown and described herein as forming the hopper 104, it should be understood that any other numbers of walls, including a single continuous wall, may also be employed and is considered to be within the scope of the present disclosure.

Figure 2:
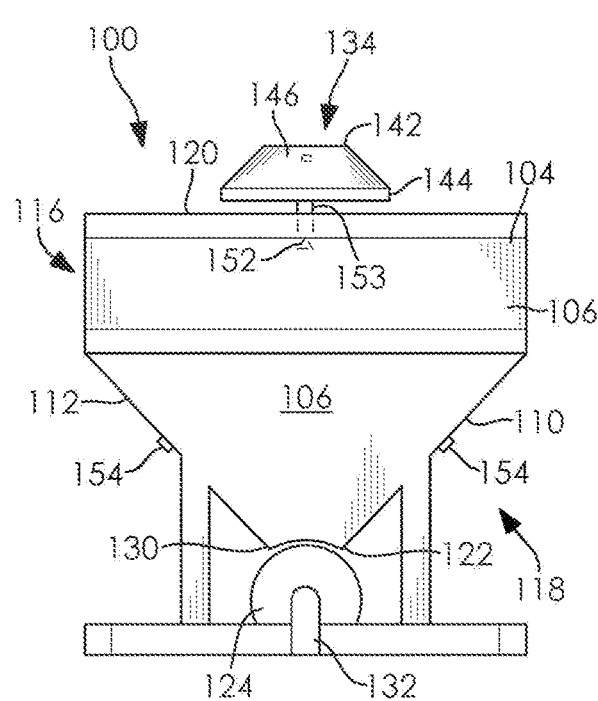
FIG. 2 is a side elevational view of the spreader of FIG. 1, and further showing a baffle system disposed above a hopper of the spreader.
Figure 3:
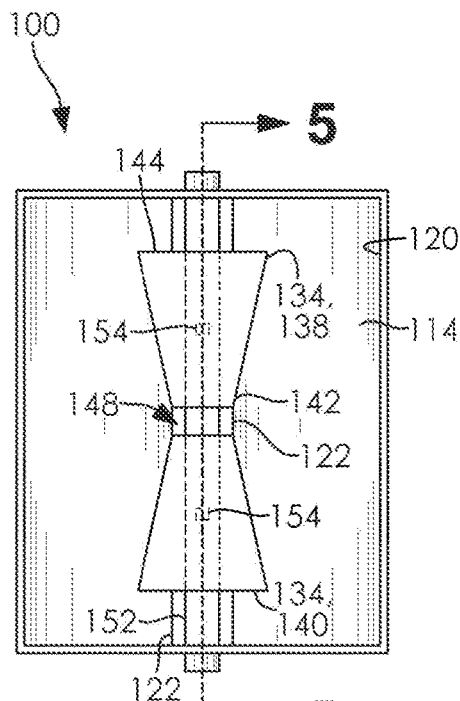
FIG. 3 is a top plan view of the spreader shown in FIG. 1.

The hopper 104 may have a top portion 116 and a bottom portion 118. The top portion 116 of the hopper 104 may have a first opening 120. The bottom portion 118 of the hopper 104 may have a second opening 122. The first opening 120 of the hopper 104 may have an area which is larger than an area of the second opening 122, for example, as shown in FIGS. 2-3. The first opening 120 may be adapted to receive the capping material 101, in operation, and the hopper 104 configured to funnel the capping material 101 toward the second opening 122.

In certain embodiments, the first sidewall 110 of the hopper 104 may be oriented at an angle relative to the second sidewall 112, and the second sidewall 112 may oriented at an angle relative to the first sidewall 110. In other words, each of the first sidewall 110 and the second sidewall 112 may taper from an area of the hopper 104 adjacent the first opening 120 of the top portion 116 to the second opening 122 of the bottom portion 118. Advantageously, each of the first sidewall 110 and the second sidewall 112 may thereby direct the capping material 101 from the first opening 120 towards the second opening 122 of the hopper 104.

Referring to FIGS. 1-2 and 4-5, the spreader 100 may further include a rotatable drum 124. The rotatable drum 124 may be substantially cylindrical in shape, as a non-limiting example. The rotatable drum 124 may be disposed adjacent to the second opening 122 of the hopper 104. The hopper 104 is configured to funnel the capping material 101 through the second opening 122 to the rotatable drum 124, in operation. Likewise, the rotatable drum 124 may be adapted to receive the capping material 101 from the second opening 122 of the hopper 104, in operation.

The rotatable drum 124 may have a plurality of grooves 128 or indentations formed on an exterior surface 126 thereof. The grooves 128 may be adapted to receive and disperse the capping material 101 into the body of water. The grooves 128 may be formed by corresponding ribs or ridges on the exterior surface 126 of the rotatable drum 124 or may be formed as depressions within the outer surface of the rotatable drum 124, as desired.

In certain embodiments, for example, as shown in FIGS. 1 and 3, the grooves 128 may be substantially chevron shaped. In such case, the chevron shaped grooves may be adapted to facilitate a distribution of the capping material 101 toward a centerline of the drum 124 as the drum 124 is rotated. In addition, the grooves 128 may also be arranged across a length of the rotatable drum 124. Other suitable shapes for the grooves 128, as well dimension and depths of the grooves 128 and associated ribs or ridges may also be selected by a skilled artisan, as desired.

With reference to FIG. 2, each of the front wall 106 and the rear wall 108 may have a curved end 130 at the bottom portion 118 of the hopper 104. Each of the curved ends 130 may have a curvature which substantially corresponds with a curvature of the rotatable drum 124. Advantageously, the curved ends 130 may enable the rotatable drum 124 to be closer to the second opening 122 of the hopper 104 compared to a hopper 104 without curved ends 130. It should be appreciated that the rotatable drum 124 being closer to the hopper 104 militates against an unwanted spilling of capping material 101 to an area outside of the hopper 104. Other suitable dimensions and shapes for the hopper 104 and the spreader 100 may also be chosen by one skilled in the art, as desired.

The rotatable drum 124 may be attached to an actuator 132, such as a motor, as a non-limiting example. The actuator 132 may be configured to rotate the rotatable drum 124 at varying speeds. For example, the actuator 132 may be hydraulic, pneumatic, mechanical, or electric. The actuator 132 may be powered via an internal combustion engine, for example. The actuator 132 may also be connected to a shaft of the drum 124 by any suitable mechanical means, including chains, belts, linkages, and the like. The actuator 132 may be in communication with a controller (156, shown in FIG. 1) that permits the operator to select or change the speed of rotation associated with the drum 124. It should be appreciated that different speeds of rotation may distribute a different amount of capping material 101 over a predetermined period of time. A skilled artisan may select a suitable actuator 132 for the rotatable drum 124, as desired.

With continued reference to FIGS. 1-5, the spreader 100 may also have a baffle system 134. The baffle system 134 may be disposed above the hopper 104 or within the hollow interior 114 of the hopper 104, or both. Advantageously, the baffle system 134 militates against a clumping of the capping material 101 within the hopper 104 when the capping material 101 contacts the baffle system 134 as the capping material 101 is directed through the spreader 100.

In certain examples, the baffle system 134 may have a support structure 136 that secures the baffle system 134 to the hopper 104. For example, the support structure 136 may be in the form of a support bar or beam 152 that is disposed across a width of the first opening 114 of the hopper 104. The beam 152 may be connected to the baffle system 134 with a plurality of struts 153 of the support structure 136, which in turn support the baffles of the baffle system 134 above the beam 152. The support structure 136 may be secured to the hopper 104 through a plurality of mechanical fasteners or welding. However, other suitable connecting methods may be chosen by one skilled in the art.

Referring still to FIGS. 1-5, the baffle system 134 may have a first baffle wall 138 and a second baffle wall 140. Each of the first baffle wall 138 and the second baffle wall 140 may be secured to the support structure 136. The first and second baffle walls 138, 140 may also be oriented at an angle, for example, as shown in FIGS. 4 and 5, and as described further herein. However, it should be appreciated that any suitable number and orientations of the baffle walls 138, 140 may be secured to the support structure 136 within the scope of the present disclosure.

In a non-limiting example, and as shown in FIG. 3, the first baffle wall 138 and the second baffle wall 140 may each be substantially trapezoidal in shape. The employed of the trapezoidal shape has been found to more evenly distribute the capping material 101 across a length of the drum 124. One of ordinary skill in the art may also select other suitable shapes for the first baffle wall 138 and the second baffle wall 140, as desired.

Furthermore, each of the first baffle wall 138 and the second baffle wall 140 may have a top end 142 and a bottom end 144. The top end 142 of the first baffle wall 138 and the second baffle wall 140 may be disposed above the bottom end 144 of the first baffle wall 138 and the second baffle wall 140. Advantageously, as shown in FIGS. 4-5, the top end 142 of each of the baffle walls 138, 140 being above the bottom end 144 of each of the other baffle walls 138, 140 creates angled surfaces 146. The angled surfaces 146 facilitate a movement of the capping material 101 to adjacent sides of the hopper 104. It should be appreciated that this arrangement further provides for a wider and more consistent distribution of capping material 101, in operation.

As shown in FIGS. 1 and 3-5, the first baffle wall 138 may be disposed adjacent to, but spaced apart from, the second baffle wall 140. More specifically, the top end 142 of the first baffle wall 138 may be spaced apart from the top end 142 of the second baffle wall 140, thereby forming a gap 148 therebetween In certain embodiments, for example as shown in FIG. 5, the first and second baffle walls 138, 140 are adapted to create a plurality of independent streams 149, 150, 151, and most particularly at least three independent streams 149, 150, 151, of the capping material 101.

It should be appreciated that the three independent streams 149, 150, 151 of capping material 101 allows the spreader 100 to form a substantially even sediment cap 102, in operation. The three independent streams 149, 150, 151 allow for a more even distribution of capping material 101 along the rotatable drum 124 as the capping material 101 passes from each of the baffle walls 138, 140 to the rotatable drum 124. Further, the three independent streams 149, 150, 151 militate against undesirable buildup of capping material 101 within the hopper 104, which militates against the need for an operator to intervene with the spreader 100, in operation. Accordingly, and advantageously, the three independent streams 149, 150, 151 of material allow the spreader 100 to be more efficient and substantially autonomous.

In a most particular embodiment, and as shown in FIG. 5, the three independent streams 149, 150, 151 includes a first independent stream 149, a second independent stream 150, and a third independent stream 151. The first independent stream 149 may contact and slide from the angled surface 146 of the first baffle wall 138. The second independent stream 150 may contact and slide from the angled surface 146 of the second baffle wall 140. The third independent stream 151 may flow through the gap 148 formed between the first and second baffle walls 138, 140. Advantageously, the orientations of the angled surface 146 and the size of the gap 148 may be selected by the skilled artisan to provide for a substantially evenly spaced apart distribution of the capping material 101 on the outer surface 126 of the rotatable drum 124 in operation.

In a further non-limiting embodiment as shown in FIGS. 3 and 5, the support bar or beam 152 may be disposed in the hollow interior 114 of the hopper 104 and below each of the first baffle wall 138 and the second baffle wall 140. More particularly, each of the first baffle wall 138 and the second baffle wall 140 may be disposed on the beam 152 such that each of the first baffle wall 138 and the second baffle wall 140 extend upwardly from the support bar 152. As a non-limiting example, the beam 152 may be triangular in cross section, which militates against buildup of the capping material 101 on the support bar 152. A skilled artisan may select other suitable shapes and placement for the support bar 152, as desired.

As shown in FIGS. 1-5, a plurality of vibrators 154 may be attached to the spreader 100. As non-limiting examples, at least one vibrator 154 may be disposed on at least one of the first side wall 110, the second side wall 112, the first baffle wall 138, and the second baffle wall 140. However, it should be appreciated that the vibrators 154 may be secured to other suitable portions of the hopper 104, and configured to facilitate the movement of the capping material 101 through the hopper 104, within the scope of the present disclosure.

For example, the vibrators 154 may be electric, air, hydraulic, pneumatic, or mechanical. The vibrators 154 will cause a moderate-to-high frequency shaking of an adjacent portion of the spreader 100 to which they are attached, in operation. A skilled artisan may select other suitable types of mechanisms for the vibrators, as desired.

Each of the plurality of vibrators 154 may further be in communication with a controller 156, for example, as shown in FIG. 1. Although the controller 156 is shown in FIG. 1 on front wall 106, it should be appreciated that the controller 156 may be disposed at another location on the spreader 100, or remote from the spreader 100, for example, at an interface or pendant in electrical communication with the spreader, as desired.

In certain embodiments, the controller may include a computer with a processor and a memory on which non-transitory processor-executable instructions are tangibly embodied. The processor-executable instructions may be selected by the skilled artisan so as to provide for either a manual, a fully automatic, or semi-automatic formation of the sediment cap 102 according to the method of the present disclosure, as described further herein.

In particular, the controller 156 may be provided either at the spreader 100, or in either a wired or a wireless remote communication for operation by the user, as desired. In the case of remote configuration, it should be appreciated that the controller 156 and the vibrators 154 may be provided with suitable transceivers and human interfacing controls.

It should be appreciated that the controller 156 may allow for both variable impact frequency and variable impact force. The impact frequency and the impact force may be selected by the operator, for example, depending on the type of the capping material 101 to be applied, as desired.

Further, it should also be appreciated that the vibrators 154 assist in the release of any capping material 101 adhering to an inner surface of the hopper 104, for example, by breaking up clumps to facilitate an even distribution of capping material 101 to the rotatable drum 124. Should the vibrators 154 not be secured to the hopper 104, a risk occurs that the volume of capping material 101 deposited by the drum 124 may otherwise vary, thereby producing a cap 102 that may lack a desired depth or evenness to hold the contaminants therein.

Figure 7:
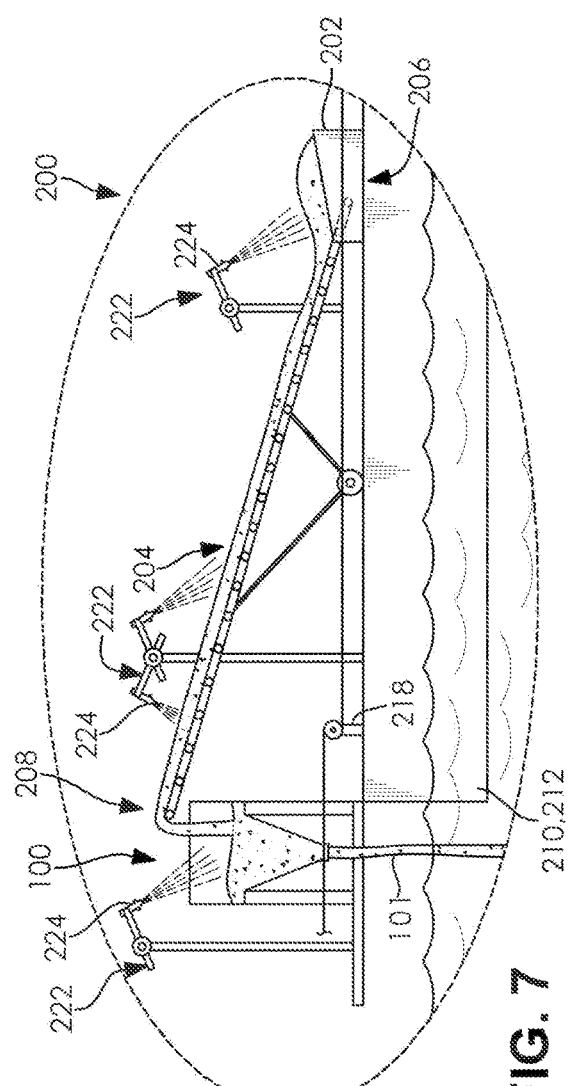
FIG. 7 is an enlarged, fragmentary, side elevational view of the sediment capping system taken at callout 7 in FIG. 6, and further depicting a fluid dispensing system.

With reference to FIGS. 6-7, a sediment capping system 200 is shown. The sediment capping system 200 may include the spreader 100, a primary container 202, and a delivery system 204. The primary container 202 may be configured to hold the capping material 101 in bulk prior to transport to the spreader 100. The delivery system 204 may be configured to transport the capping material 101 from the primary container 202 to the spreader 100, in operation.

In particular embodiments, the delivery system 204 may be a conveyor system. For example, the conveyor system may be a belt conveyor disposed between the primary container 202 and the spreader 100. However, other conveyors such as a wire mesh conveyor, plastic belt conveyor, bucket conveyor, screw conveyor, auger conveyor, or a drag conveyor, may be chosen by one skilled in the art, as desired.

The delivery system 204 may have a first end 206 and a second end 208. The first end 206 of the delivery system 204 may be disposed in or adjacent the primary container 202, while the second end 208 of the delivery system 204 may be disposed above or adjacent the spreader 100. The delivery system 204 may be adapted to carry the capping material 101 from the first end 206 of the delivery system 204 in the primary container 202 to the second end 208 of the delivery system 204 disposed above the spreader 100.

The sediment capping system 200 may further include a floating platform 210. The floating platform 210 may be disposed on a primary vessel 212, for example. The floating platform 210 may be adapted to support the spreader 100, the primary container 202, and the delivery system 204 on the body of water.

As further shown in FIGS. 6-7, the spreader 100 may also be placed at an edge of the platform 210. The placement of the spreader 100 at the edge of the platform 210 may be employed to facilitate a spreading of the capping material 101 into the water. However, it should be appreciated that any other suitable location for the spreader 100 may also be employed.

In certain embodiments, the sediment capping system 200 may also include a secondary vessel 214. The secondary vessel 214 may include a secondary container 216 for holding additional capping material 101. For example, the secondary container 216 may be larger than the primary container 202, and may also be adapted to hold a larger quantity of capping material 101 than the primary container 202.

In a non-limiting example, the primary vessel 212 and the secondary vessel 214 may each be barge, where the primary vessel 212 is linked to the secondary vessel 214. The sediment capping system 200 may include several individual barges linked together. Additionally, in a further example, the primary vessel 212 may be moved by a winch 218. The winch 218 may be secured to the shore or other stationary or sufficiently anchored object. However, the primary vessel 212 may also be moved by a suitable engine or other means as may be chosen by a skilled artisan.

It should be appreciated that a directional motion of the primary vessel 212 may determine the amount of capping material 101 that is distributed on the subaquatic floor. The faster the primary vessel 212 is moving relative to the sediment, the less capping material 101 that will be distributed per an area of the subaquatic floor below. Similarly, the slower the primary vessel 212 is moving relative to the sediment, the greater the amount of capping material 101 that will be distributed per an area of the subaquatic floor below.

Additionally, and with continued reference to FIGS. 6-7, the platform 210 may also support an excavator 220. The excavator 220 is adapted to transfer the capping material 101 from the secondary container 216 to the primary container 202. A skilled artisan may select other suitable methods for transporting the capping material 101 from the secondary container 216 to the primary container 202, as desired.

With continued reference to FIGS. 6-7, the sediment capping system 200 may include a fluid dispensing system 222 for delivery of water or an aqueous solution to the capping material 101. The fluid dispensing 222 system may be configured to wet the capping material 101 in at least one of the primary container 202 and in the delivery system 204 where the capping material 101 is transported to the spreader 100. In certain embodiments, the fluid dispensing system 222 may include a plurality of nozzles 224. The nozzles 224 may be disposed above at least one of the primary container 202, the delivery system 204, and the spreader 100, as non-limiting examples. Other suitable means for pre-wetting the capping material 101 may also be selected by a skilled artisan within the scope of the present disclosure.

Figure 8:
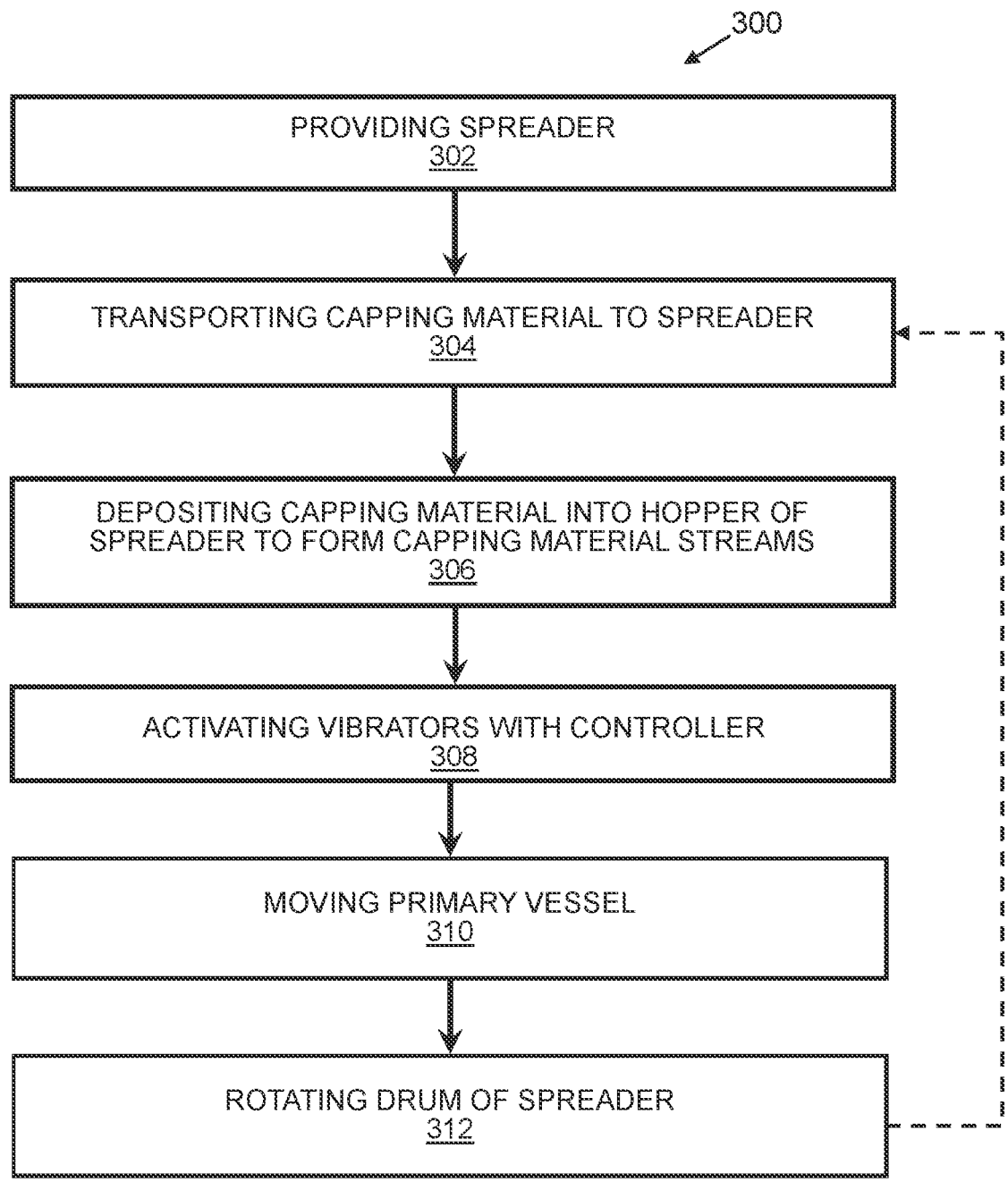
FIG. 8 is a flow chart illustrating a method of forming a sediment cap according to yet another embodiment of the present disclosure.

With reference to FIG. 8, a method 300 of forming the sediment cap 102 is shown. A first step 302 in the method 300 is providing the spreader 100, as described hereinabove.

A second step 304 in the method 300 includes a transporting of the capping material 101 to the spreader 100. More particularly, the capping material 101 may be disposed in the secondary container 216 of the secondary vessel 214. The secondary vessel 214 may be pulled to the primary vessel 212 via the winch 218, for example. When the secondary vessel 214 is disposed adjacent to the primary vessel 212, the excavator 220 may be used to transfer the capping material 101 to the primary container 202 where the capping material 101 may then be wetted by the fluid dispensing system 222.

A third step 306 in the method 300 includes a depositing of the capping material 101 through the first opening 120 of the spreader 100. The delivery system 204 may remove the capping material 101 from the primary container 202, and dispose the capping material 101 in the spreader 100 via the first opening 120. The capping material 101 may then form the plurality of independent streams 149, 150, 151, for example, by operation of the baffle system 134. The plurality of independent streams 149, 150, 151 are then directed to through the second opening 122 to the rotatable drum 124.

During the method 300, a fourth step 308 of the method may include an activating of the plurality of vibrators 154, for example, via the controller 156. The capping material 101 may thereby be fractured or broken up and homogenized by the shaking of the hopper 104 by the vibrators 154. The baffle system 134 and the hopper 104 may each vibrate synergistically to create an even distribution of materials across the outer surface 126 of the rotatable drum 124. It should be appreciated that this may produce the sediment cap 102 with a more consistent depth or evenness, and which will require no or minimal further leveling procedures. Likewise, and due to no or minimal further leveling procedures being necessary, the underlying sediment will be minimally disturbed.

The fifth step 310 in the method may include a moving of the primary vessel 212. As a non-limiting example, the primary vessel 212 may move across a predetermined route where the sediment cap 102 is desired to be placed or formed. Accordingly, the sediment cap 102 may be formed over a predetermined area as the primary vessel 212 moves along the predetermined route.

A sixth step 312 in the method 300 includes a rotating of the rotatable drum 124 of the spreader 100 to distribute and disperse the capping material 101 of the capping material streams 149, 150, 151 into the body of water, and to form the sediment cap 102 on the subaquatic floor of the body of water. It should be understood that the method 300 may be repeated, as many times as necessary, until the sediment cap 102 is formed over the predetermined area to the desired depth.

It should be appreciated that the speed of the primary vessel 212 and the rotational speed of the rotatable drum 124 may each be selected to facilitate the formation of the desired depth of capping material 101 on the underlying sediment of the subaquatic floor.

In a non-limiting example, the winch 218 and the actuator 132 of the drum 124 may each be in communication with the controller 156. The controller 156 may thereby be configured to move the primary vessel 212 at a predetermined speed and is adapted to rotate the drum 124 at a predetermined rate to create the desired depth of capping material 101 over the sediment below. The speed of the primary vessel 212 and the rotating drum 124 may be monitored and adjusted, as necessary, by the operator or the automatically by the controller 156 during the formation of the sediment cap 102.

Advantageously, the spreader 100 and the sediment capping system 200 of the present disclosure delivers the capping material 101 at relatively high rates of production with minimal disturbance of the subaquatic sediment.

While certain representative embodiments and details have been shown for purposes of illustrating the invention, it will be apparent to those skilled in the art that various changes may be made without departing from the scope of the disclosure, which is further described in the following appended claims.

What is claimed is:

1. A spreader for sediment capping, comprising:
   a hopper having a hollow interior, a first opening, and a second opening, the first opening configured to receive capping material;
   a baffle system disposed above the hopper and within the hopper and configured to separate the capping material into a plurality of capping material streams; and
   a rotatable drum disposed beneath the hopper, the rotatable drum adapted to receive the capping material streams and disperse the capping material of the capping material streams into a body of water to form a sediment cap on a subaquatic floor of the body of water.

2. The spreader of claim 1, wherein the rotatable drum has a plurality of grooves that are adapted to receive the capping material streams.

3. The spreader of claim 2, wherein the grooves arranged across a length of the rotatable drum.

4. The spreader of claim 1, wherein the hopper has a top portion, a bottom portion, a front wall, a rear wall, a first side wall, and a second side wall.

5. The spreader of claim 4, wherein the first sidewall of the hopper is oriented at an angle relative to the second sidewall, and the second sidewall is angled relative to the first sidewall.

6. The spreader of claim 5, wherein the first opening of the hopper has an area that is larger than an area of the second opening of the hopper.

7. The spreader of claim 6, wherein the bottom portion of each of the front wall and rear wall has a curvature corresponding with a shape of the rotatable drum.

8. The spreader of claim 5, further comprising at least one vibrator configured to facilitate a movement of the capping material through the hopper to the rotatable drum.

9. The spreader of claim 8, wherein the at least one vibrator is affixed to at least one of the first sidewall, the second sidewall, and the baffle system.

10. The spreader of claim 9, wherein the at least one vibrator is one of electric, air, hydraulic, pneumatic, and mechanical.

11. The spreader of claim 10, further comprising a controller in communication with the at least one vibrator and configured to provide both variable impact frequency and variable impact force.

12. The spreader of claim 1, wherein the baffle system includes a first baffle wall and a second baffle wall, each of the first baffle wall and the second baffle wall having a top end and a bottom end, and the top end being disposed above the bottom end to provide angled surfaces configured to form at least a portion of the capping material streams.

13. The spreader of claim 12, wherein each of the first baffle wall and the second baffle wall are disposed above the hopper.

14. The spreader of claim 12, further comprising a support structure that secures each of the baffle wall and the second baffle wall to the hopper.

15. The spreader of claim 12, further comprising a support bar disposed beneath each of the first baffle wall and the second baffle wall, the support bar extending across the hollow interior of the hopper, the support bar configured to further contact the capping material streams formed by the baffle system to militate against clumps in the capping material streams.

16. A sediment capping system, comprising:
   a spreader for sediment capping, including a hopper, a baffle system, and a rotatable drum, the hopper having a hollow interior, a first opening, and a second opening, the first opening configured to receive capping material, the baffle system disposed above and within the hopper and configured to separate the capping material into a plurality of capping material streams, and the rotatable drum disposed beneath the hopper, the rotatable drum adapted to receive the capping material streams and disperse the capping material of the capping material streams into a body of water to form a sediment cap on a subaquatic floor of the body of water;
   a primary container configured to hold the capping material in bulk prior to transport to the spreader; and
   a delivery system adapted to transport the capping material from the primary container to the spreader.

17. The sediment capping system of claim 16, further comprising a floating platform on which the primary container, the delivery system, and the spreader are disposed, the spreader disposed adjacent an end of the floating platform.

18. The sediment capping system of claim 16, further comprising a fluid dispensing system configured to wet the capping material in at least one of the primary container and in the delivery system as the capping material is transported to the spreader.

19. A method of forming a sediment cap on a subaquatic floor of a body of water, the method comprising the steps of:
   providing a spreader for sediment capping, including a hopper, a baffle system, and a rotatable drum, the hopper having a hollow interior, a first opening, and a second opening, the first opening configured to receive capping material, the baffle system disposed above and within the hopper and configured to separate the capping material into a plurality of capping material streams, and the rotatable drum disposed beneath the hopper, the rotatable drum adapted to receive the capping material streams and disperse the capping material of the capping material streams into a body of water to form a sediment cap on a subaquatic floor of the body of water;
   transporting the capping material to the spreader;
   depositing the capping material through the first opening of the hopper of the spreader to form the capping material streams; and
   rotating the rotatable drum of the spreader to distribute and disperse the capping material of the capping material streams into the body of water to form the sediment cap on the subaquatic floor of the body of water.

\* \* \* \* \*